United States Patent
Devendran et al.

(10) Patent No.: US 10,443,711 B2
(45) Date of Patent: Oct. 15, 2019

(54) METHOD AND APPARATUS FOR STORING KINETIC ENERGY WITHIN AN AUTOMATIC TRANSMISSION ACCUMULATOR

(71) Applicant: Ford Global Technologies, LLC, Dearborn, MI (US)

(72) Inventors: Ram Sudarsan Devendran, Farmington Hills, MI (US); John Edward Brevick, Livonia, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 15/494,675

(22) Filed: Apr. 24, 2017

(65) Prior Publication Data

US 2018/0306314 A1    Oct. 25, 2018

(51) Int. Cl.
| | |
|---|---|
| F16H 61/00 | (2006.01) |
| F16H 61/30 | (2006.01) |
| F15B 1/02 | (2006.01) |
| F15B 1/033 | (2006.01) |
| F16H 59/54 | (2006.01) |
| F16H 59/68 | (2006.01) |

(52) U.S. Cl.
CPC ......... *F16H 61/0021* (2013.01); *F15B 1/024* (2013.01); *F15B 1/033* (2013.01); *F16H 61/30* (2013.01); *B60Y 2300/18125* (2013.01); *F16H 59/54* (2013.01); *F16H 59/68* (2013.01); *F16H 2059/683* (2013.01); *F16H 2061/0034* (2013.01); *F16H 2061/305* (2013.01)

(58) Field of Classification Search
CPC ...... F16H 61/0021; F16H 61/30; F16H 59/54; F16H 59/68; F16H 2061/0034; F16H 2061/305; F16H 2059/683; F15B 1/024; F15B 1/033; F60Y 2300/18125
See application file for complete search history.

(56) References Cited

U.S. PATENT DOCUMENTS

| | | | |
|---|---|---|---|
| 7,147,078 B2 | 12/2006 | Teslak et al. | |
| 8,397,848 B2 | 3/2013 | Read | |
| 8,968,135 B2 | 3/2015 | Stephens et al. | |
| 9,199,647 B2 * | 12/2015 | Zhang | B60K 6/12 |
| 9,346,347 B2 | 5/2016 | Gray, Jr. | |
| 10,233,949 B2 | 3/2019 | Versteyhe et al. | |
| 2011/0263381 A1 * | 10/2011 | Katou | F16H 61/0021 477/115 |
| 2013/0179046 A1 * | 7/2013 | Nassouri | F15B 1/08 701/60 |

(Continued)

FOREIGN PATENT DOCUMENTS

EP    3040226 A1    7/2016

*Primary Examiner* — David J Hlavka
(74) *Attorney, Agent, or Firm* — David Kelley; Brooks Kushman, P.C.

(57) ABSTRACT

A vehicle having a controller is provided. The controller may be configured to, responsive to identification of a braking event predicted to occur in the future, hydraulically charge an accumulator, and responsive to a pressure of the accumulator exceeding a first threshold, cease charging the accumulator, and satisfy transmission line pressure demand with pressure from the accumulator to begin depleting the accumulator to a before initiation of the braking event.

20 Claims, 5 Drawing Sheets

(56) References Cited

U.S. PATENT DOCUMENTS

| | | |
|---|---|---|
| 2014/0137545 A1 | 5/2014 | Smith et al. |
| 2016/0208910 A1* | 7/2016 | Kotsuji ............... F16H 61/0437 |
| 2016/0221448 A1 | 8/2016 | Pritchard |
| 2017/0130740 A1* | 5/2017 | Waterstredt ............. F15B 1/033 |
| 2018/0229623 A1* | 8/2018 | Baeumler ........... F16H 61/0025 |
| 2018/0306313 A1* | 10/2018 | Devendran ......... F16H 61/0021 |
| 2018/0345950 A1 | 12/2018 | Devendran et al. |

\* cited by examiner

METHOD AND APPARATUS FOR STORING KINETIC ENERGY WITHIN AN AUTOMATIC TRANSMISSION ACCUMULATOR

TECHNICAL FIELD

The present disclosure relates to controlling regenerative-braking torque in a vehicle equipped with an automatic transmission.

BACKGROUND

Fuel economy and emissions performance of an automobile is an important characteristic. A higher fuel economy and lower emissions rating may make a vehicle more attractive to potential buyers and may help an automotive manufacturer meet fuel economy and emissions standards imposed by local governments. One method of reducing fuel consumption and decreasing vehicle emissions is capturing kinetic energy generated by a moving vehicle. Capturing kinetic energy dissipated when friction brakes are applied is well known. However, these methods often involve complex and expensive components. Kinetic energy may also be present and lost within an automatic transmission. Automatic transmissions may utilize pressurized hydraulic fluid to power the various hydraulic components within the transmission.

SUMMARY

According to one embodiment of this disclosure, a vehicle having a controller is provided. The controller may be configured to, responsive to identification of a braking event predicted to occur in the future, hydraulically charge an accumulator, and responsive to a pressure of the accumulator exceeding a first threshold, cease charging the accumulator, and satisfy transmission line pressure demand with pressure from the accumulator to begin depleting the accumulator to a before initiation of the braking event.

According to another embodiment of this disclosure a method of operating a vehicle is disclosed. The method may include hydraulically charging an accumulator responsive to identification of a braking event to occur in the future. The method may also include ceasing charge of the accumulator responsive to a pressure of the accumulator exceeding a first threshold and satisfying transmission line pressure demand with pressure from the accumulator and satisfying transmission line pressure demand with pressure from the accumulator to deplete the accumulator to a transmission line pressure demand exceeding requirements of the pressure line before the braking event.

According to yet another embodiment of this disclosure, a vehicle is provided. The vehicle may include a pump, an accumulator, and a controller. The controller may be configured to, responsive to identification of a braking event predicted to occur in the future, increase displacement of the pump to hydraulically charge the accumulator, and responsive to a pressure of the accumulator exceeding a first threshold, cease charging the accumulator, reduce the displacement, and satisfy transmission line pressure demand with pressure from the accumulator to deplete the accumulator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current automatic transmissions have hydraulically actuated clutches and brakes for controlling the gearing using a hydraulic pump to pressurize and pump fluid to the control elements. Typically, the pump is driven directly by an engine via a mechanical coupling such as an input shaft. The pump may provide hydraulic fluid to various control elements and to an accumulator coupled to or within the automatic transmission. The accumulator may include piston or diaphragm or bladder and is used to store hydraulic fluid and disperse hydraulic fluid through a series of pressure lines to actuate clutches and brakes to control the gearing within the automatic transmission.

Capturing kinetic energy dissipated when friction brakes are applied are well known. However, these methods often involve complex and expensive components. Kinetic energy may also be present and lost within an automatic transmission. Automatic transmissions may utilize pressurized hydraulic fluid to power the various hydraulic components within the transmission. It is advantageous to capture, store, and release this kinetic energy generated within an automatic transmission. As the vehicle is braking or decelerating, the vehicle generates kinetic energy. This kinetic energy may be captured by utilizing the kinetic energy to operate the pump and to provide hydraulic fluid to charge the accumulator. During subsequent drive events, the energy stored, in the form of pressurized hydraulic fluid, within the accumulator may be used to hydraulically actuate clutches and brakes within the transmission. Upon discharging the accumulator, the pump may be modulated to meet the hydraulic requirements of the transmission.

Figure 1:
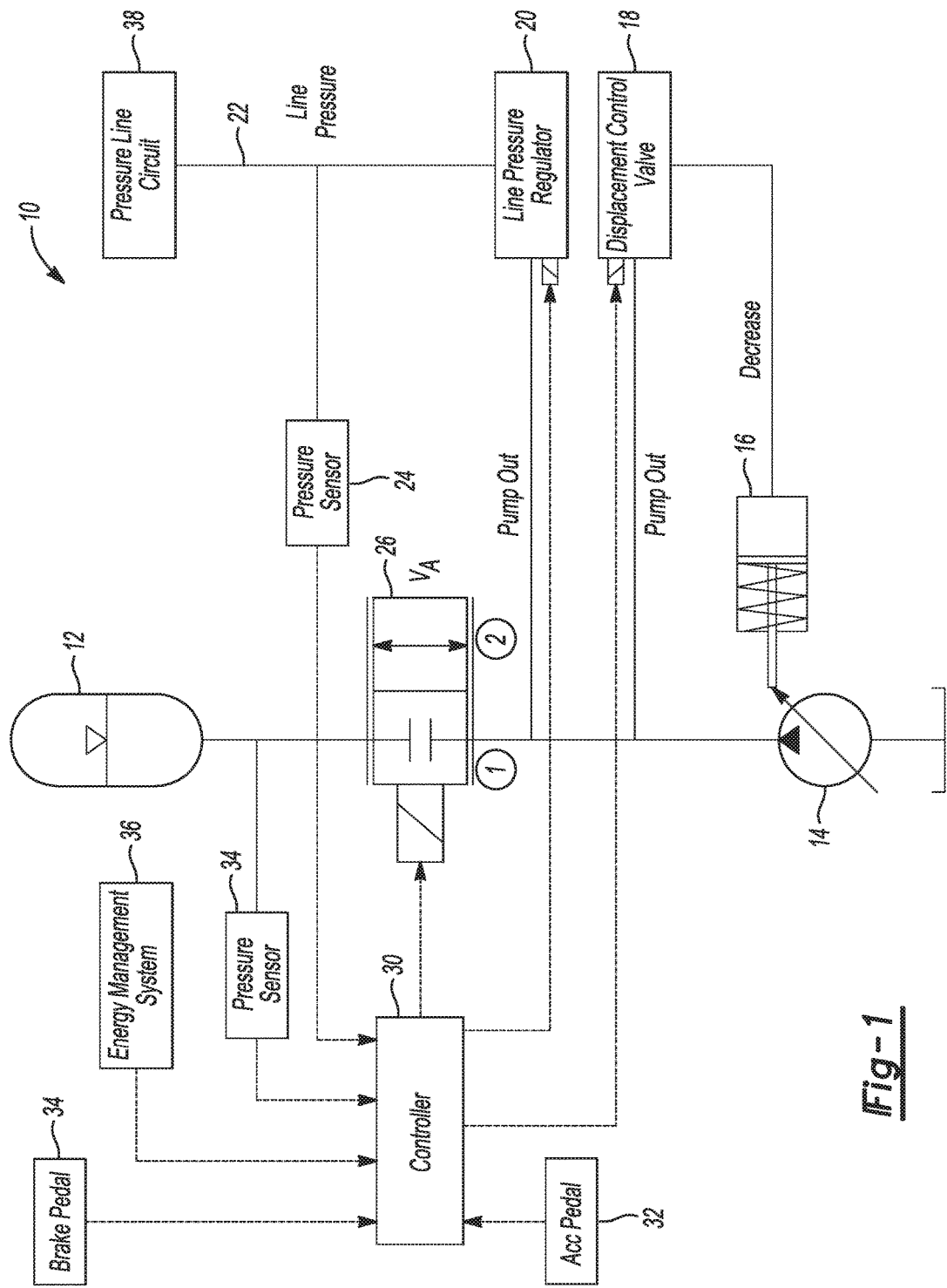
FIG. 1 is a schematic diagram of an example hydraulic circuit according to one embodiment of this disclosure.

Referring to FIG. 1, a schematic diagram of an example hydraulic circuit 10 utilized within an automatic transmission according to one embodiment of this disclosure is illustrated. The circuit 10 includes an accumulator 12 operatively coupled with a variable displacement pump 14. The accumulator 12 may include a piston and spring that may be actuated to store and disperse hydraulic fluid received by the pump 14. The size of the accumulator may range from twenty (20) to two-hundred (200) times the size of the pump.

Meaning if the pump is sized of 0.025 liters per revolution, the accumulator may have the size between 0.5 L to 5.0 L. If the accumulator is too small, it cannot capture a sufficient quantity of kinetic energy generated during a braking event. If the accumulator is too large, the accumulator may be difficult to package within the transmission or vehicle. The capacity of the accumulator 12 may be determined by measuring the amount of pressure within the accumulator. Therefore, pressure of the accumulator 12 and the capacity of the accumulator 12 may be proportional. As the pressure within the accumulator 12 increases, the capacity of the accumulator decreases. As the pressure within the accumulator 12 decreases, the capacity of the accumulator increases.

The pump 14 is mechanically connected, directly or indirectly, to an input shaft coupled to an engine (not shown) and converts mechanical energy to hydraulic energy. The displacement or amount of fluid pumped per revolution of the input shaft may be varied while the pump is running. The displacement of the pump may be altered by the displacement changing mechanism 16. The altered flow may be may be actively controlled based on input from the controller 30 and independent of the line pressure. The displacement changing mechanism may include a spring and a piston or other suitable means to control the displacement of the pump.

A displacement control valve 18 is hydraulically connected to the displacement changing mechanism and pump. The valve 18 may be opened or closed or disposed somewhere between the open and closed position to actively control of the displacement of the fluid. A line pressure regulator 20 is connected between the accumulator, variable displacement pump and a pressure line circuit 38. While the pressure line circuit 38 is represented by a black box, the pressure line circuit may include a plurality of pressure lines each connected to various control elements, e.g., brakes and clutches within the transmission.

The line pressure regulator 20 facilitates control of the pressure within the hydraulic pressure lines. The line pressure regulator 20 may control the line pressure based on a solenoid command from the controller. The line pressure regulator 20 may enable isolation of the accumulator circuit from the line pressure circuit 38 to prevent pressurization of the line pressure circuit. A line pressure sensor 24 is disposed between the pressure line circuit 38 and the line pressure regulator 20. The pressure sensor 24 may determine the pressure within the line and provide a signal to the controller 30 that is indicative of the measured pressure. The controller 30 may provide a signal to the line pressure regulator 20 to command the line pressure regulator to increase, decrease or maintain the pressure within the hydraulic line.

A valve 26 is hydraulically connected between the accumulator 12 and the pump 14. The valve 26 may have two positions of operation, position 1 and position 2. In position 1, the pump flow is disconnected from the accumulator and the fluid flow is sent to the line pressure regulator 20 and the line pressure circuit 38. In position 2, the pump flow is directed to charge the accumulator 12. The valve 26 may also be of proportional type, taking a position anywhere between position 1 and position 2. The valve 26 may receive a signal from the controller 30 to alter the position of operation from position 1 to position 2 and vice-versa. An accumulator pressure sensor 28 may be hydraulically connected between the valve 26 and the accumulator 12. The accumulator pressure sensor 28 is configured to provide a signal to the controller 30 that is indicative of the capacity of the accumulator. If the accumulator has no capacity, the pressure of the accumulator 12 is at its highest point. If the accumulator has capacity, the pressure of the accumulator 12 will be less than the highest measured point.

The controller 30 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

The controller 30 may also be configured to dynamically change the operative position of the valve 26 based on the conditions of the vehicle at a future point in time. For example, an energy management system 36 may be electrically coupled with the controller 30 such that the controller may alter the operation of the circuit 10 for various conditions.

Figure 2:
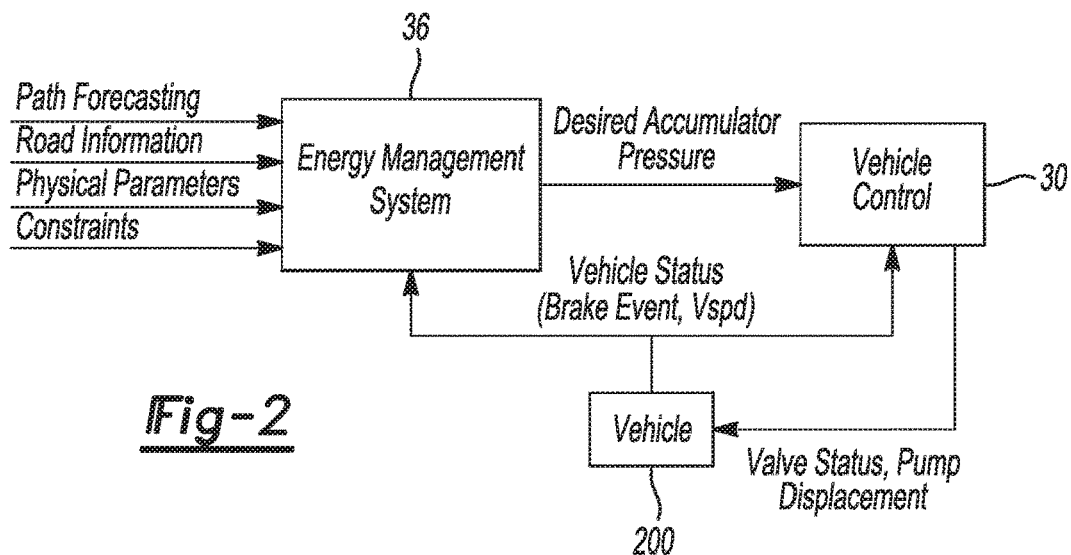
FIG. 2 is a schematic diagram of an example vehicle control circuit according to one embodiment of this disclosure.

Referring specifically to FIG. 2, a schematic of a control circuit including an energy management system 36 operatively connected to the vehicle 200 and controller 30. The energy management system 36 may include a plurality of sensors capable of forecasting a vehicle path, road information, physical parameters and other constraints. The energy management system 36 may communicate signals indicative of a desired accumulator pressure or pump displacement to the controller 30. The controller may provide signals to the vehicle to operate one or more components including but not limited to valve position and pump displacement.

The energy management system may determine a change in elevation along the route and communicate a signal to the controller 30 to command the pump to turn on or discharge according to the changes in potential braking along the route. The system 36 may also consider changes in posted speeds that are indicative of locations at which brakes 34 may be applied to reduce the speed, or an accelerator pedal 32 may be used to increase the speed. The system 36 may also determine locations at which a potential stopping point is, such as static locations and dynamic locations. A static location at which a potential stopping point is, includes a traffic light, a stop sign, a round-about, or a yield sign. A dynamic location at which a potential stopping point is along the route includes locations associated with traffic congestion, weather conditions, road construction, or accidents.

The route may be displayed by a navigation system (not shown) connected to the energy management system 36. The route may also be based on map data that has been preloaded in the memory of the navigation system, or the navigation system may receive data streamed from a remote server. The data may be streamed wirelessly using cellular, Wi-Fi or other standard technology. Based on the route, changes in elevation, and potential stopping points along the route the controller 30 may adjust the flow of fluid with in the hydraulic circuit 10. This adjustment reserves hydraulic energy for operating control elements within the transmission.

Figure 3:
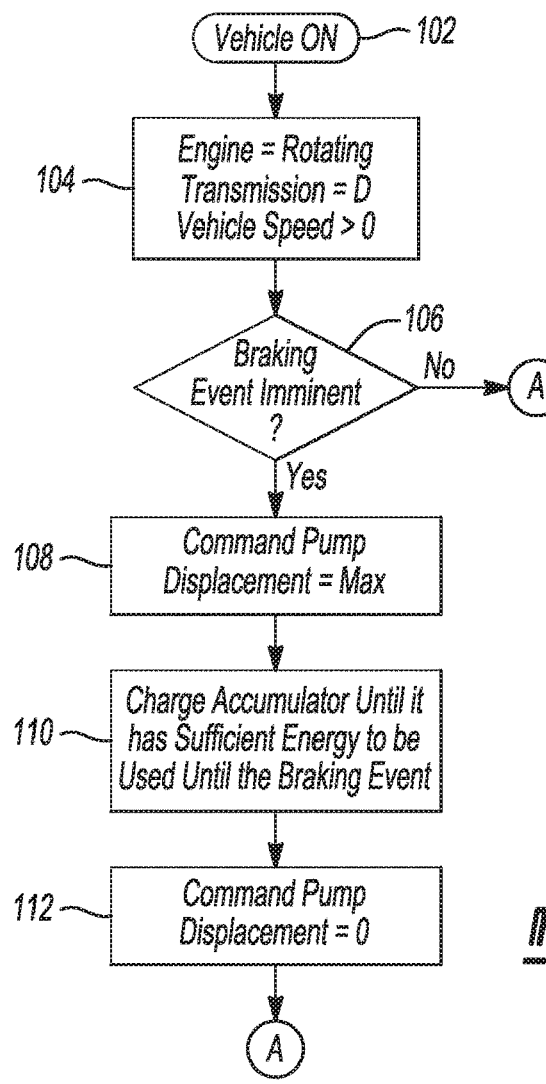
FIG. 3 is a flow chart illustrating a method for operating an automatic transmission according to at least one embodiment.
Figure 4:
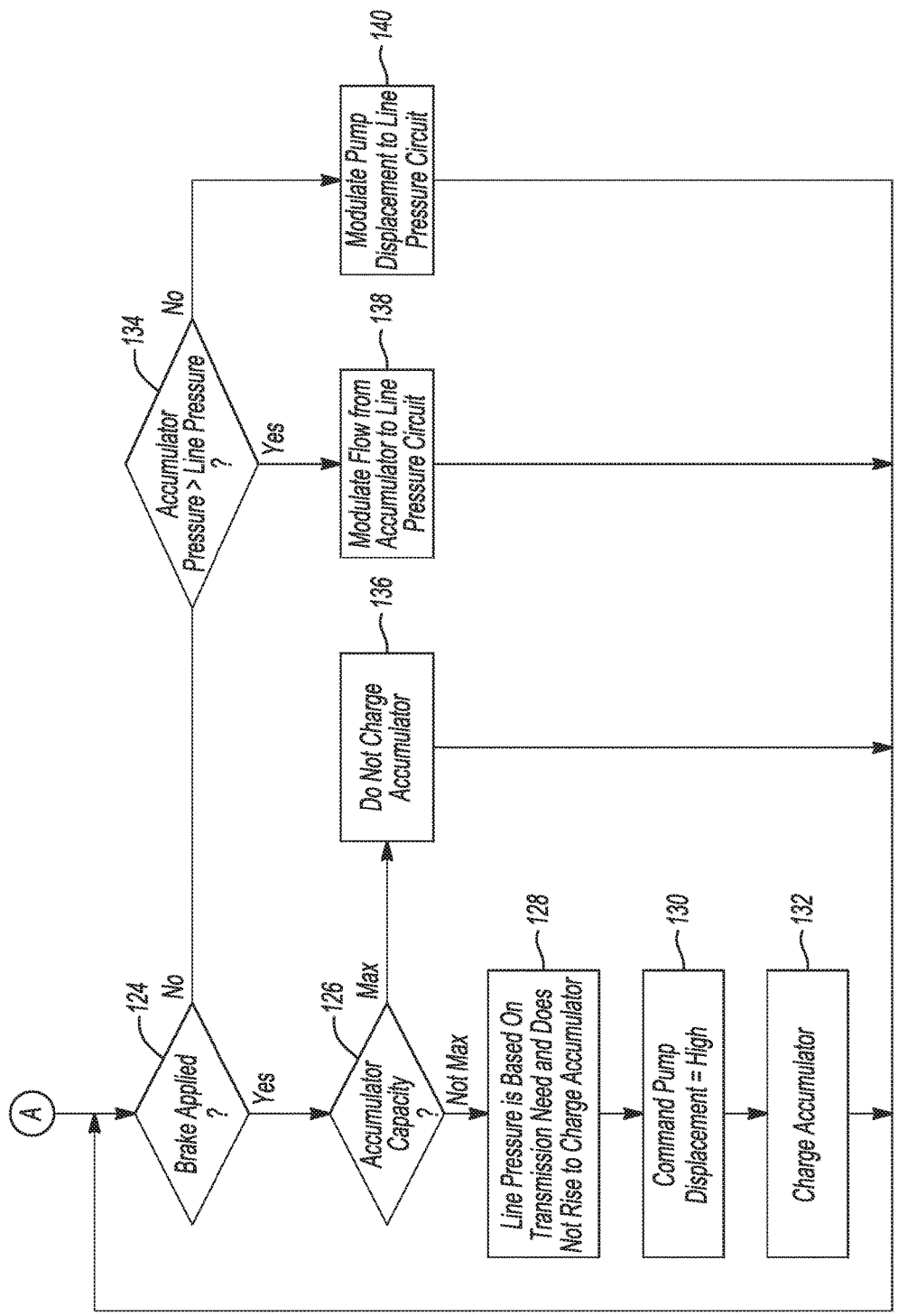
FIG. 4 is a flow chart illustrating a method for operating an automatic transmission according to at least one embodiment.

Referring to FIGS. 3 and 4, a flow chart illustrating a method for operating an automatic transmission according to at least one embodiment is shown. In operation 102, the vehicle is powered on by a turnkey ignition or some other suitable ignition. In operation 104, the engine (not shown) is rotating or running and providing rotational movement to the input shaft and pump. The transmission is placed in drive or "D" and vehicle speed is above 0 mph.

In operation 106, the controller branches based on receiving a signal indicative of an imminent braking event. The controller may receive a signal from the energy management system 36 that may include a global positioning sensor (GPS), a navigation system, a data acquisition system, or other suitable means that may determine whether braking event is imminent. If a braking event is not imminent, the controller branches to operation 'A.' If the controller receives a signal indicative of a braking event is imminent or is going to occur in the future, the controller branches to operation 108.

In operation 108, after determining that a braking event is imminent, the controller 30 commands the pump 14 to pump at maximum displacement. Maximum displacement may mean the pump is providing flow at or near 100% of its available capacity. In operation 110 the accumulator 12 is charged until it reaches a threshold. The threshold may be a level of charge that is sufficient for a future braking event. The threshold may be set by a predetermined pressure within the accumulator as measured by one or more sensors, including but not limited to the pressure sensor 28.

In operation 112, the displacement of the pump 14 is commanded zero by altering the pump displacement mechanism 116. Changing the displacement of the pump to zero, may decrease the amount of energy required to operate the pump. The displacement of the pump 14 may be changed by altering the pump displacement changing mechanism 16. As the displacement of the pump decreases so does the amount of energy required to operate the pump. The controller then moves onto operation 124.

In operation 124, the controller branches based on the occurrence of a braking event. The controller 30 may receive a signal that is indicative of a braking event. The braking event may occur in response to application of the brake pedal 34. The braking event may also occur in response to application of the friction brakes after receiving a signal of from an adaptive cruise control unit or another automatic braking sensor. If the brake is applied the controller branches to 126.

In operation 126, the controller branches based on the capacity of the accumulator. If the accumulator is full, the controller branches to operation 136 and the accumulator is not charged. If the accumulator is not full, the controller branches to 128. In operation 128, the required line pressure is based on pressure required to satisfy control of the clutches or brakes within the transmission. The controller branches to operation 130 where the pump is powered on and the commanded pump displacement is increased to at or near 100%. Because the pump is commanded pump displacement is increased to at or near 100% in operation 130, the valve 26 is actuated to allow flow from the pump to the accumulator to charge the accumulator. In operation 132, the accumulator is charged to meet the required line pressure determined in operation 128. In operation 132, the accumulator 12 is then charged using the kinetic energy generated by the engine through the input shaft to the pump 14 so that the pump 14 provides fluid to the accumulator 12.

If the braking event does not occur, the controller branches to operation 134. In operation 134, the controller branches based on the accumulator pressure being greater than the line pressure. The accumulator pressure may be determined by the accumulator pressure sensor 28 determining the pressure within the line near the accumulator 12. The pressure of the hydraulic line 22 may be determined by the line pressure sensor 24. If the accumulator pressure is greater than the line pressure, the valve 26 may be at least partially opened to move fluid from the accumulator 12 to the line pressure circuit 38. If the accumulator pressure is less than the line pressure, the controller branches to operation 140 and the pump is commanded to on to pressure the line pressure circuit.

Figure 5:
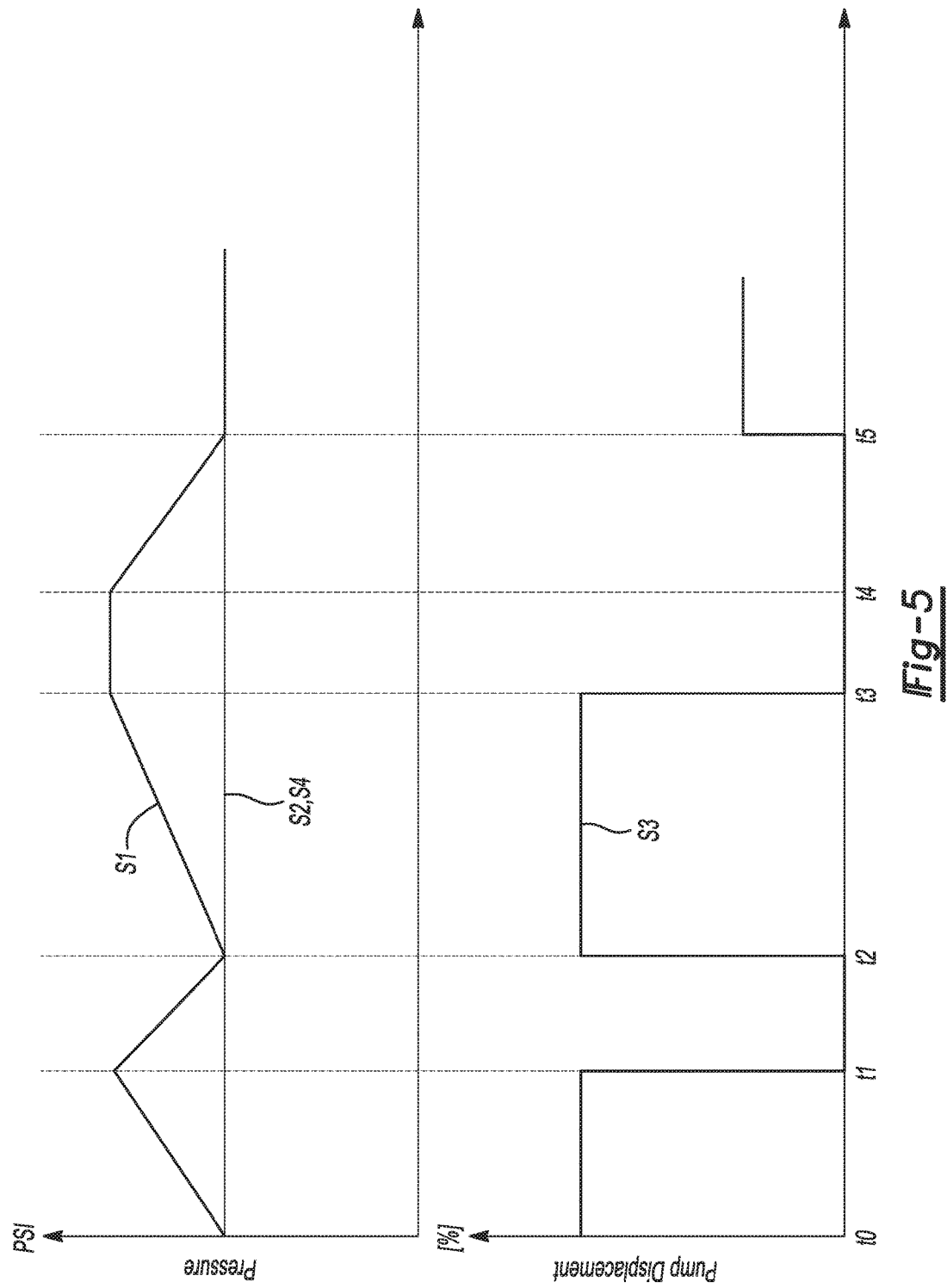
FIG. 5 is a graph showing the operating states of the accumulator and pump.

Referring to FIG. 5, a graph illustrating the status of hydraulic components, and pump displacement and pressure characteristics of the hydraulic components during a driving and braking event. The top graph is representative of the accumulator pressure (psi) and the demanded and actual transmission line pressure over time. Line 51 represents the accumulator pressure, line S2 represents the demanded transmission line pressure of the pressure line circuit 38. Line S4 represents the actual pressure of the pressure line circuit 38. The mean actual pressure of the pressure line circuit 38 closely tracks the demanded transmission line pressure. Line S3 in the bottom graph represents the pump displacement as a percentage.

At t0 a braking event is predicted to occur at t2. At t0 the displacement of the pump is increased to at or near 100%. The pump provides sufficient flow to charge the accumulator is until it reaches its maximum capacity at t1. Between t0 and t1, in addition to charging the accumulator, the pump provides sufficient pressure to satisfy the demand of the transmission pressure line circuit S2. At t1, the displacement of the pump is commanded to 0% and the fluid within the accumulator is used to satisfy the demand of the transmission pressure line circuit S2.

At t2 the brake is applied and the vehicle slows and comes to a stop at t3. At t2, the displacement of the pump is increased to at or near 100% and remains at or near 100% until the vehicle is stopped. As the vehicle is slowing, the kinetic energy of the vehicle powers the pump, thus saving energy. As the pump operates from the kinetic energy of the vehicle, the pump 14 satisfies transmission line pressure demand and charges the accumulator 12. Between t3 and t4 the accumulator maintains its pressure and the pump displacement is commanded to zero.

At t4, the vehicle begins to move. The vehicle may move in response to the operator pressing the accelerator pedal 32. At this point the accumulator satisfies transmission line pressure demand and the pressure of the accumulator is gradually decreased until t5. At t5, the pressure of the accumulator is depleted and the pump is commanded to provide sufficient pressure to satisfy the demanded pressure of the transmission line circuit 38.

Figure 6:
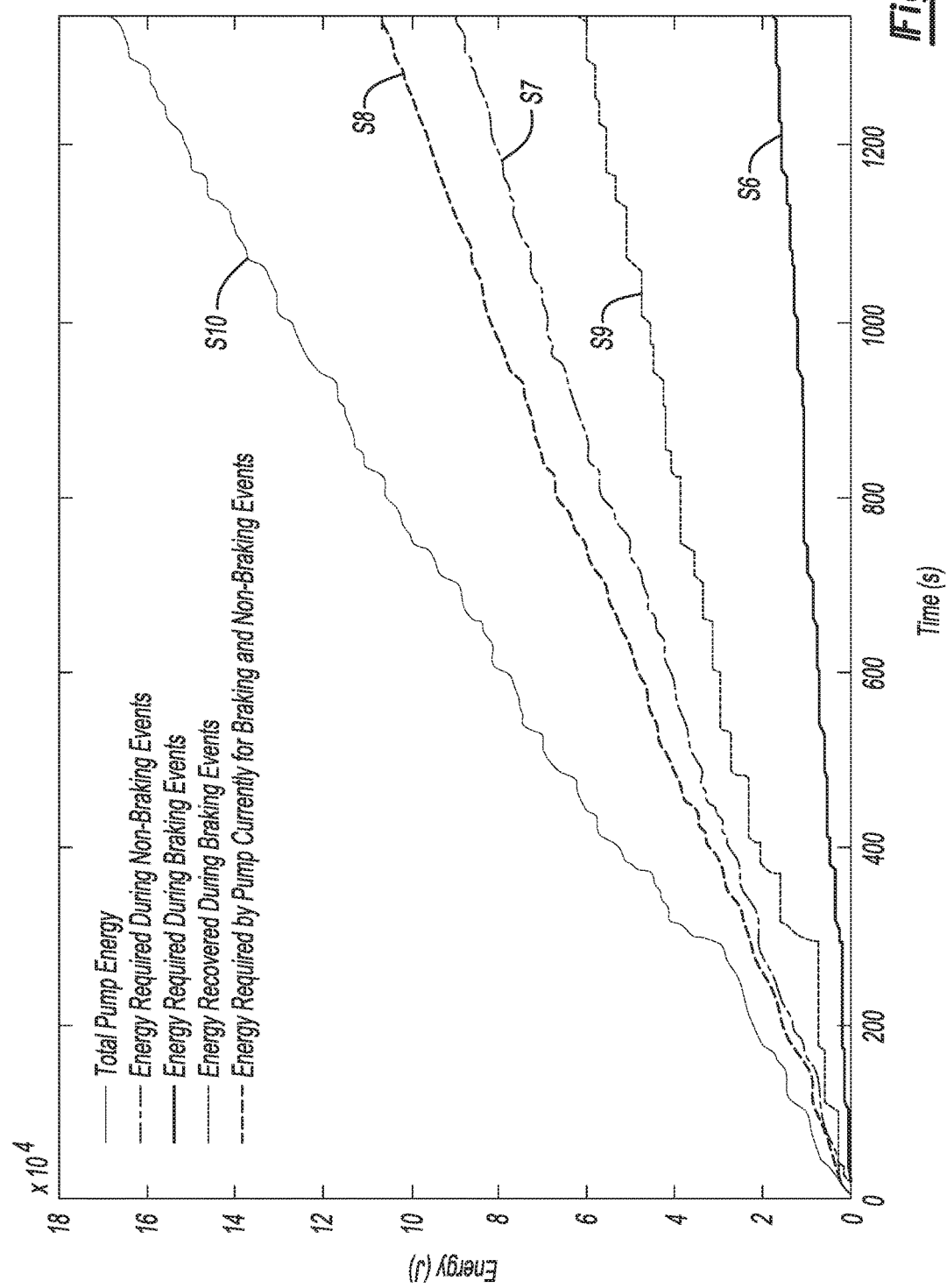
FIG. 6 is a graph illustrating the amount of energy required versus time according to one or more embodiments of this disclosure.

Referring to FIG. 6, a graph illustrating the amount of energy required to run the pump during non-braking events and during braking events and the amount of energy recovered during the braking event. Line S6 represents the pump energy required during braking events. Line S7 represents the energy required during non-braking events, including but not limited to, driving at a constant speed or coasting when a braking event is imminent. Line S8 represents energy required by the pump currently for braking and non-braking events. Line S9 represents energy that is recovered during braking events. Line S10 represents the total pump energy or the summation of line S8 and line S9. The difference between the line S8 and line S9 indicates the amount of energy to be provided by the pump in addition to that recovered from the pump. Line S9 also represents the energy saved in terms of fuel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a controller configured to,
        responsive to identification of a braking event predicted to occur in the future, hydraulically charge an accumulator, and
        responsive to a pressure of the accumulator exceeding a first threshold, cease charging the accumulator, and satisfy a transmission line pressure demand with pressure from the accumulator to begin depleting the accumulator before initiation of the braking event.

2. The vehicle of claim 1, wherein the controller is further configured to, responsive to the pressure of the accumulator falling below a second threshold, satisfy the transmission line pressure demand with pressure from a pump.

3. The vehicle of claim 2, wherein the controller is further configured to, responsive to the braking event, decrease displacement of the pump before initiation of the braking event to decrease an amount of energy used to power the pump.

4. The vehicle of claim 1, wherein the controller is further configured to, responsive to the pressure of the accumulator being greater than the transmission line pressure, open a valve to facilitate flow from the accumulator to a transmission pressure line.

5. The vehicle of claim 1, wherein the controller is further configured to, responsive to initiation of the braking event, increase displacement of a pump to hydraulically recharge the accumulator by utilizing kinetic energy produced by an engine during the braking event.

6. The vehicle of claim 1, wherein the controller is further configured to, responsive to a capacity of the accumulator being below a threshold, increase displacement of a pump to hydraulically recharge the accumulator by utilizing kinetic energy produced by an engine during the braking event.

7. The vehicle of claim 1, wherein the controller is further configured to responsive to initiation of the braking event and a capacity of the accumulator exceeding a threshold, increase displacement of a pump to hydraulically recharge the accumulator by utilizing kinetic energy produced by the vehicle during the braking event.

8. A method of operating a vehicle:
    hydraulically charging an accumulator responsive to identification of a braking event to occur in the future;
    ceasing charge of the accumulator responsive to a pressure of the accumulator exceeding a first threshold; and
    satisfying a transmission line pressure demand with pressure from the accumulator to begin depleting the accumulator before initiation of the braking event.

9. The method of claim 8, further comprising satisfying the transmission line pressure with pressure from a pump responsive to the pressure of the accumulator falling below a second threshold.

10. The method of claim 9, further comprising decreasing displacement of the pump before initiation of the braking event to decrease an amount of energy used to power the pump.

11. The method of claim 8, further comprising opening a valve to facilitate flow from the accumulator to a transmission pressure line responsive to the pressure of the accumulator being greater than the transmission line pressure.

12. The method of claim 8, further comprising, responsive to initiation of the braking event, increasing displacement of a pump to hydraulically recharge the accumulator by utilizing kinetic energy produced by an engine during the braking event.

13. The method of claim 12, further comprising increasing the displacement of the pump to hydraulically recharge the accumulator by utilizing kinetic energy produced by the engine during the braking event in response to a capacity of an accumulator being below a threshold.

14. The method of claim 13, further comprising increasing the displacement of the pump to hydraulically recharge the accumulator by utilizing kinetic energy produced by the engine during the braking event in response to initiation of the braking event and the capacity of the accumulator exceeding a threshold.

15. A vehicle comprising:
    a pump;
    an accumulator selectively connected to the pump; and
    a controller configured to,
        responsive to identification of a braking event predicted to occur in the future, increase displacement of the pump to hydraulically charge the accumulator, and
        responsive to a pressure of the accumulator exceeding a first threshold, cease charging the accumulator, reduce the displacement, and satisfy a transmission line pressure demand with pressure from the accumulator to deplete the accumulator.

16. The vehicle of claim 15, wherein the controller is further configured to, responsive to the pressure of the accumulator falling below a second threshold, satisfy the transmission line pressure demand with pressure from the pump.

17. The vehicle of claim 16, wherein the controller is further configured to, responsive to the pressure of the accumulator falling below the second threshold, open a valve to facilitate flow from the pump to a transmission pressure line.

18. The vehicle of claim 15, wherein the controller is further configured to responsive to the braking event, decrease the displacement of the pump before the braking event to decrease an amount of energy used to power the pump.

19. The vehicle of claim 15, wherein the controller is further configured to, responsive to the pressure of the accumulator being greater than transmission line pressure, open a valve to facilitate flow from the accumulator to a transmission pressure line.

20. The vehicle of claim 15, wherein the controller is further configured to responsive to initiation of the braking event, increase the displacement to hydraulically recharge the accumulator by utilizing kinetic energy produced by the vehicle during the braking event.

* * * * *